United States Patent [19]

Tin

[11] Patent Number: 4,766,605
[45] Date of Patent: Aug. 23, 1988

[54] TELEPHONE TIE TRUNK DRIVER CIRCUIT

[75] Inventor: Lucas Tin, Union City, Calif.

[73] Assignee: International Business Machines Corporation, Armonk, N.Y.

[21] Appl. No.: 874,013

[22] Filed: Jun. 13, 1986

[51] Int. Cl.$^4$ .............................................. H04M 7/00
[52] U.S. Cl. .................................... 379/225; 379/377; 379/412; 379/413; 323/274
[58] Field of Search ............... 379/225, 413, 412, 398, 379/399, 377; 323/273, 274, 275, 284

[56] References Cited

U.S. PATENT DOCUMENTS

| | | | |
|---|---|---|---|
| 4,302,726 | 11/1981 | Shobbrook | 323/275 X |
| 4,428,015 | 1/1984 | Nesler | 323/284 X |
| 4,525,602 | 6/1985 | Robra et al. | 379/413 X |

Primary Examiner—James L. Dwyer
Attorney, Agent, or Firm—Blakely, Sokoloff, Taylor & Zafman

[57] ABSTRACT

A driver circuit to drive an M-lead in a tie trunk between telephone branch exchanges is disclosed. The driver continues to provide for a current increase as the resistance of the load on the M-lead decreases, until at a particular point maximum current is achieved. After this point, as the resistance of the load continues to decrease, the driver circuit decreases the load current, such that power dissipation in the driver is kept at a safe level for a device. The V-I characteristic of the driver circuit is such that for any given value of load resistance, the circuit has only one possible point of operation which will eliminate any possibility of latch-up. Simplicity and precision are also achieved by this circuit. The accuracy of the performance characteristic is limited only by the tolerance of the passive components used.

16 Claims, 8 Drawing Sheets

Fig. 3b SIMPLE SWITCH (PRIOR ART)

Fig. 3c CURRENT LIMITING (PRIOR ART)

Fig. 3d SPEC. REQUIREMENT

Fig. 3e POSSIBILITIES FOR CURVE

TELEPHONE TIE TRUNK DRIVER CIRCUIT

BACKGROUND OF THE INVENTION

1. Field of the Invention

The present invention relates to an improvement of electronic driver circuit used on telecommunication lines and more specifically on telephone signalling lines.

2. Prior Art

In a simple telephone system, phone connection is made to the local telephone company for connection to a calling destination. In a complex system, multiple telephone units are tied into a branch exchange, such being designated as a private branch exchange (PBX). The PBX controls the routing of calls from each telephone unit, normally designated as an extension, to the local telephone company. The PBX allows intra-PBX communication without utilizing the local telephone company. In essence, many telephone units may be utilized, although a limited number of trunk lines exist between the PBX and the telephone company.

A more complex system may employ more than one PBX. A typical situation arises when significant physical distances separate the telephone units. In this instance, it is more efficient to utilize multiple PBXs and have telephone units tie into the nearest PBX. Further, inter-PBX communication may occur without accessing the local telephone company. By providing inter-PBX trunk lines, connections can take place between PBXs without utilizing the local telephone company. Also, PBX's may be connected through signalling units to provide inter-PBX communication when physical distance separating the PBX's is significant.

In a typical inter-PBX system, E and M lines which are well-known in the telephone communication industry, are utilized for signalling between the PBXs. Signalling is necessary for providing the hand-shake to connect the desired extensions. The M-lead provides a voltage or a ground potential for signalling purposes. Prior art electrical circuits have been designed to provide the necessary drive on the M-lead. However, prior art methods have employed cumbersome mechanical relays having relatively short life span and circuits requiring large power dissipation to meet standards required by the Electrical Industry Association (EIA). One form of a prior art circuit requires considerable heat sinking of active devices to dissipate heat because of the large power dissipation of the devices. Use of heat sinks also requires significant physical space.

The present invention provides an electrical circuit to drive the M-lead of a tie trunk without resulting in a large dissipation of power in case of short-circuit faults. The improved driver circuit will not require massive heat sinking of active devices, and therefore will reduce the spatial requirement, yet still meet the EIA standards as regards to M-lead requirements. Further, reliability is improved because of the reduced requirement for maximum heat dissipation. Reduced heat sinking will also result in cost savings.

SUMMARY OF THE INVENTION

An electrical driver circuit used to provide the necessary drive on an M-lead as required by EIA standards is disclosed. The M-lead is used as one of the interconnecting signal links between two branch exchanges. The driver circuit places a ground or a voltage potential on the M-lead when so selected. In this particular application, the driver circuit switches between ground and −48 volt potential.

When the −48 volt potential is chosen, EIA standards require the M-lead to provide a sinking current of up to 85 mA from the load ($Z_L$) with no more than 5 V drop across the circuit. Normally, a load will not reach the maximum of 85 mA. However, if $Z_L$ is zero, a condition which may occur when $Z_L$ is shorted to ground, then the driver circuit must dissipate all of the power.

EIA standards also require a ground potential to be placed on the M-lead when so desired. A second switch is allotted to provide this function. The second switch requirement provides for a drive of up to 50 mA with no more than a 1 volt drop across the circuit. Because the second switch connects a ground onto the M-lead, shorting of $Z_L$ which places a ground on the M-lead is typically not a problem; however, protection for the second switch is desirable because the M-lead could be shorted to −48 V, which produces a similar situation to the second switch as a ground short to the first switch.

The present invention describes an improved driver circuit that provides 85 mA at −48 volts to $Z_L$ under maximum operational condition, but reduces power dissipation in the driver circuit as $Z_L$ decreases beyond the operational unit. By controlling the power dissipation in the circuit, such as when $Z_L$ is equivalent to a short, massive heat sinking is avoided and yet still meeting EIA standards for M-leads. This is accomplished by having a particular voltage-current (V-I) curve of the driver circuit such that the load current will continue to increase as the load resistance decreases; however, when load current reaches its maximum level, the V-I characteristic provides for a decrease in load current as load resistance continues to decrease.

Although the driver circuit is disclosed in conjunction with driving an M-lead in a tie trunk between PBX's, those skilled in the art will realize that the circuit may be utilized in any telephone line driver, as well as in any other power controlling application.

Accordingly, one object of the present invention is to limit the maximum current available from a particular power driver and to adjust the current from a power driver in such a manner to reduce the current drain as load impedance decreases.

Another object of the invention is to present a V-I characteristic in such a manner that there is a single operating point chosen by a particular load (to prevent the possibility of latch-up).

Another object of the invention is to reduce the power dissipation in a driver, thereby reducing the actual physical size of the components or eliminating the need for heat sinking.

Further object of the invention is that the V-I characteristic is realized by a simple circuit using an op amp and a transistor as active components, yet providing high accuracy and predictability.

DETAILED DESCRIPTION OF THE PRESENT INVENTION

Figure 1:
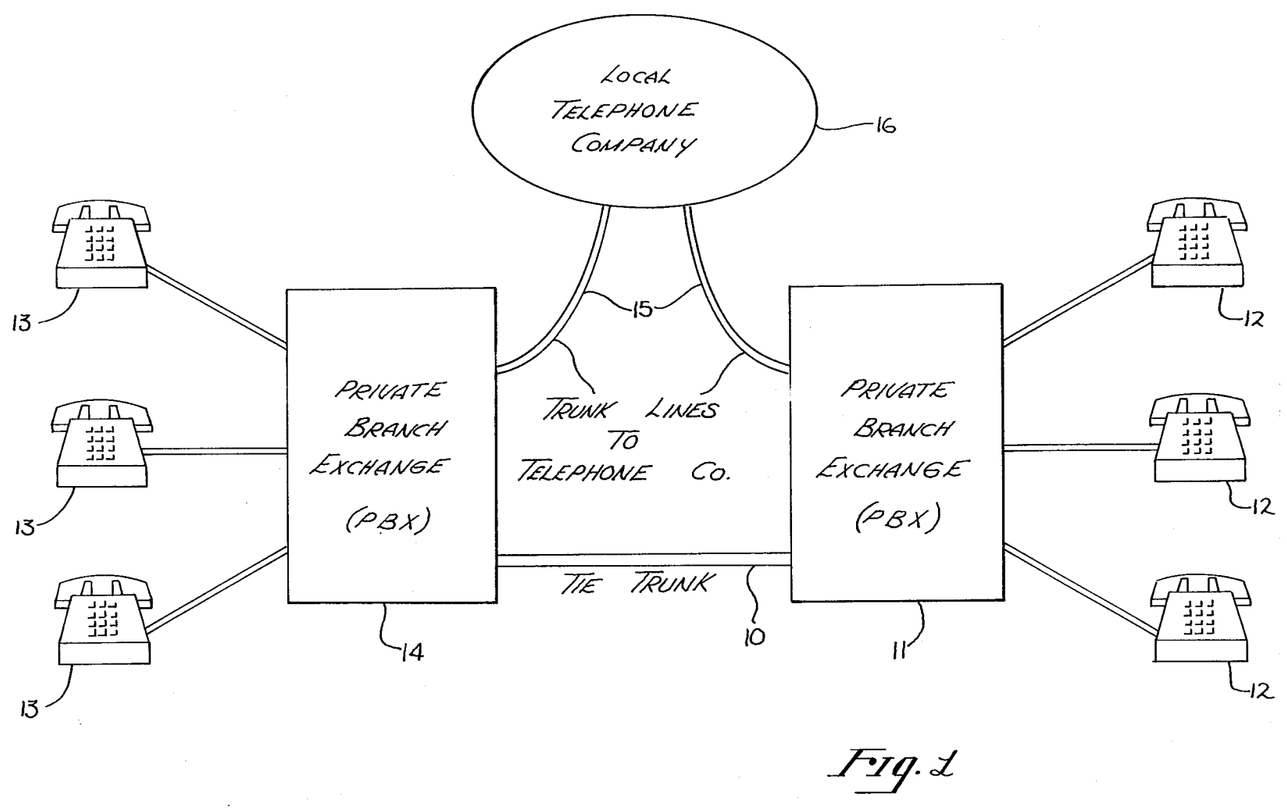
FIG. 1 illustrates a typical multiple CBX system utilizing a tie trunk.

The present invention describes an improved driver circuit for driving an M-lead employed on tie trunks between two telephone branch exchanges. FIG. 1 illustrates a typical multiple PBX system utilizing a tie trunk 10 between PBXs 11 and 14. Individual telephone units 12 tie into PBX 11, while other telephone units 13 tie into PBX 14. PBXs 11 and 14 are connected to the local telephone company 16 by telephone company trunk lines 15. Tie trunk 10, however, connects PBXs 11 and 14 directly without accessing the telephone company 16.

Figure 2:
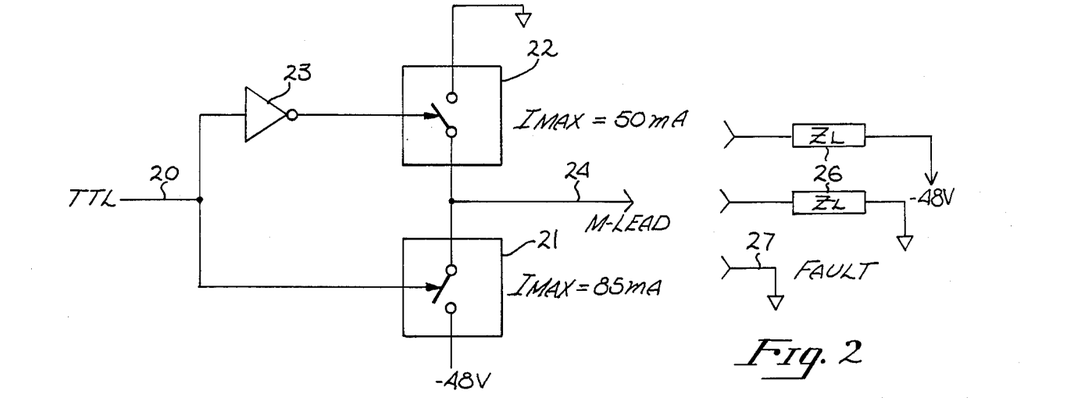
FIG. 2 is a block diagram of a M-lead driver circuit functionally showing the driver circuit as a switch.

In FIG. 2, a basic block diagram illustrates the function of the driver circuit. A TTL level signal at the input terminal 20 is coupled to switch 21 and through inverter 23 to switch 22. The TTL level signal controls the activation of switches 21 and 22. One contact of switch 21 is coupled to −48 volts, while the other contact across the switch arm is coupled to M-lead 24. Switch 22 has one contact coupled to M-lead 24 and the other contact across the switch arm to ground. A particular logic level activates (closes) switch 21 and the opposite logic level, due to an equivalent inverter 23, operates switch 22. Hence, at any given time, either switch 21 or 22 is closed, thereby alternately placing −48 volts or a ground potential on M-lead 24. A load, designated by impedance $Z_L$ 26 connected to M-lead 24 will source or sink current depending on the position of switches 21 and 22. When switch 21 is closed, the load is coupled to a ground and when switch 22 is closed, the load is coupled to −48 V.

EIA standards require M-lead 24 to source up to 50 mA at −48 volts when switch 22 is closed and M-lead 24 to sink up to 85 mA at −48 volts when switch 21 is closed. Further, EIA standards allow for no more than five volts to be dropped across switch 21 at the maximum current of 85 ma and no more than one volt to be dropped across switch 22 at the maximum current of 50 mA.

A major problem area occurs when $Z_L$ 26 drops to a very low impedance. A common occurrence of this problem arises when a short is impressed across $Z_L$ 26, such as an improper termination at the load end of M-lead 24. This short is represented by fault condition 27 connecting the M-lead to ground.

Note that with this short, switch 22 is not affected but a maximum current of 85 mA will flow through switch 21. Because there is no other resistance on the line, switch 21 must dissipate all of the power (85 mA×48 volts=4.08 watts). Hence, for each driver circuit employed, switch 21 of each driver circuit must be capable of dissipating 4.08 watts as a worst case condition. To dissipate 4.08 watts, physically large devices or small devices with physically large heat sinks must be provided for switch 21. This results in considerable waste because switch 21 does not, under normal operating conditions, dissipate 4.08 watts, but rather, is a worst case fault condition. This worst case condition assumes that prior art circuits utilize some current limiting scheme at the maximum current value to limit the maximum power dissipated at 4.08 watts.

A similar worst case condition may exist when switch 22 is closed. If $Z_L$ 26 is connected to −48 volts at the time $Z_L$ 26 shorts, a possibility exists in which −48 volts is impressed completely across switch 22. When this condition occurs, switch 22 must be capable of dissipating 2.40 watts (50 mA×48 volts=2.40 watts). Because switch 22 has a power dissipation value which is lower than that of switch 21, the following explanation is given relative to switch 21. However, the same formulation applies also to switch 22 in determining its circuit parameters.

Figure 3A:
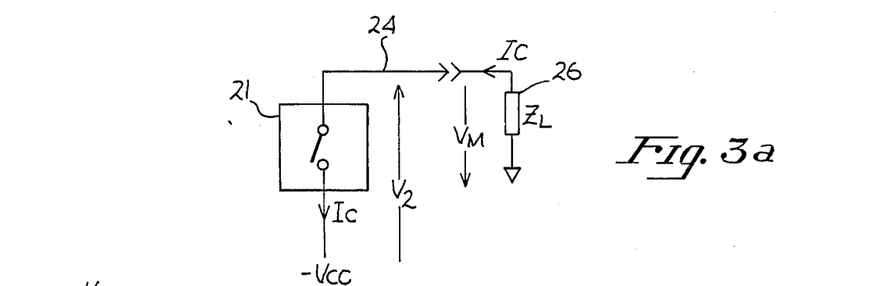
FIG. 3a is an equivalent circuit of a switch of FIG. 2 and showing the circuit parameters.
Figure 3B:
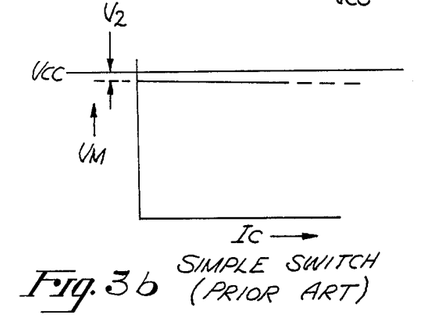
FIG. 3b is a graphic representation of circuit parameters of a simple prior art switch.
Figure 3C:
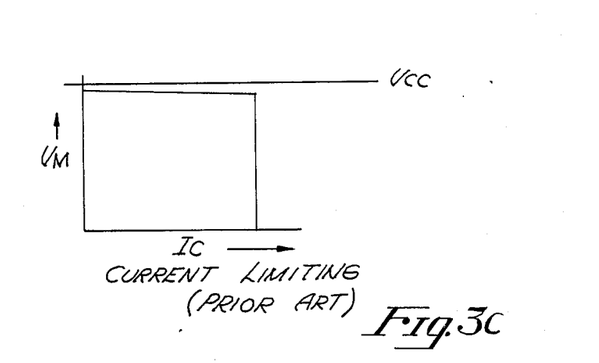
FIG. 3c is a graphic representation of circuit parameters of a prior art current limiting switch.
Figure 3D:
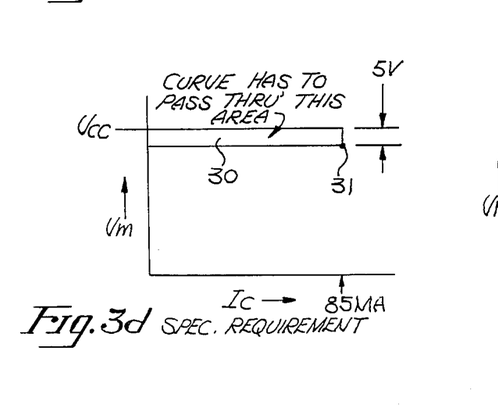
FIG. 3d is a graphic representation of circuit parameters under a M-lead driver specification requirement.

FIG. 3a is an equivalent circuit of switch 21 and load $Z_L$ 26 connected by M-lead 24, wherein voltage $V_2$ is the drop across switch 21 and voltage $V_M$ is the drop across $Z_L$ 26. $V_2$ and $V_M$ are referenced in the illustrations of FIGS. 3b–3e. The preferred embodiment is tailored to the worst case condition. FIG. 3b illustrates a simple prior art switch configuration (such as a relay) where voltage $V_M$ drops across $Z_L$ 26 and voltage $V_2$ drops across switch 21. FIG. 3c is another prior art configuration where current $I_C$ is limited to a maximum value, such as at 85 mA. FIG. 3c illustrates the normal operating area as required by EIA standards. Namely, a maximum of 85 mA to be sourced on the M-lead 24 with no more than a 5 volt drop across switch 21. Hence, the normal operating V-I curve must lie horizontally within the enclosed area 30.

Figure 3E:
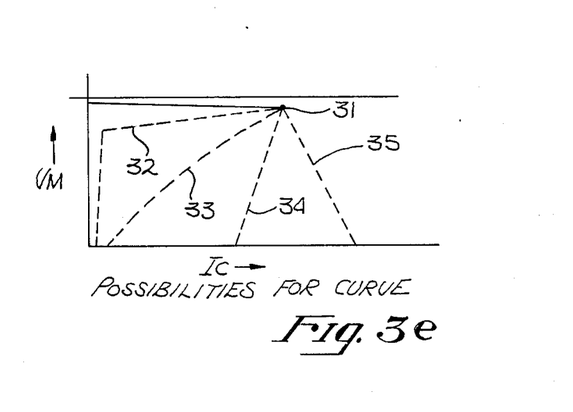
FIG. 3e is a graphic representation of circuit parameters showing alternate responses of a M-lead driver external to specification requirements.

Whenever $Z_L$ 26 attempts to draw more than the maximum current or causes voltage $V_M$ to fall below the operating area, as when M-lead 24 is shorted, EIA standards are no longer applicable and the circuit may resort to a number of responses as shown by curves 32, 33, 34 and 35 of FIG. 3e. Naturally, a smaller current curve such as curve 32 or 33 is preferable, because at $V_M=0$, $V_2=V_{CC}$ and $Z_L=0$, practically all of the power will be dissipated in the circuit within switch 21.

Figure 4A:
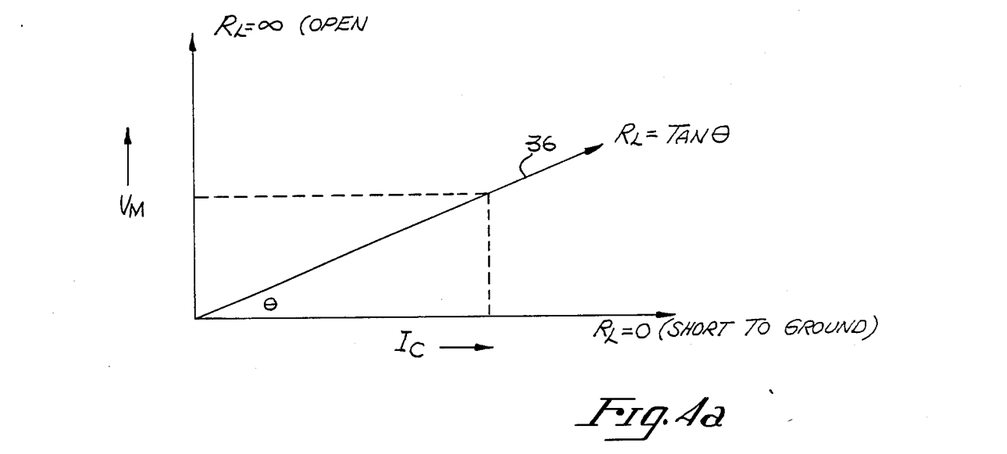
FIG. 4a is a graphic representation of a typical load line of a M-lead driver.

In FIG. 4a, a typical load line 36 is represented on the same V-I axis as FIGS. 3b–3e. The resistive component of $Z_L$ 26 is equivalent to tangent $\theta$ because $$R_L = \frac{V_M}{I_C} \qquad \text{Equation 1}$$

Figure 4B:
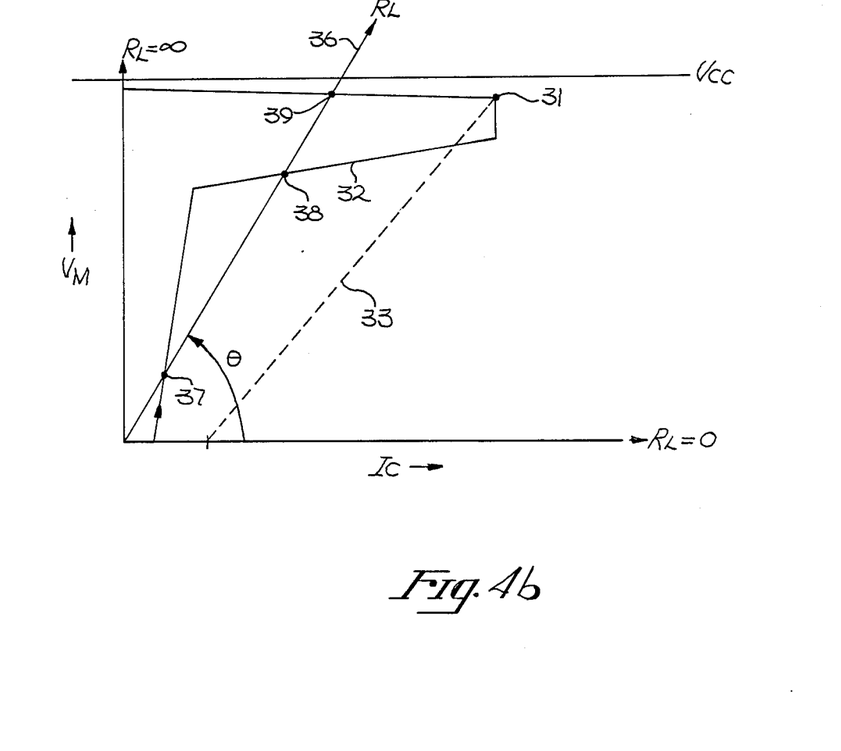
FIG. 4b is a graphic representation of the latching of a load line to a typical M-lead driver.

Although minimum $I_C$ is desired as $V_M$ drops below operating point 31, FIG. 4b illustrates the problem of choosing a curve such as curve 32. Load line 36 crosses curve 32 in three different points, 37, 38 and 39. Hence, the driver circuit can latch-up to any of the points 37, 38, or 39. Latch-up is a failure of an operating system to return to an originally intended operating point after a transition to a different operating point. However, by having the circuit follow curve 33, multiple latch-up problem is alleviated. Load line 36 for any given value of $R_L$ (and hence a given $\theta$) will cross curve 33 only at one point, thereby preventing latch-up.

Figure 4C:
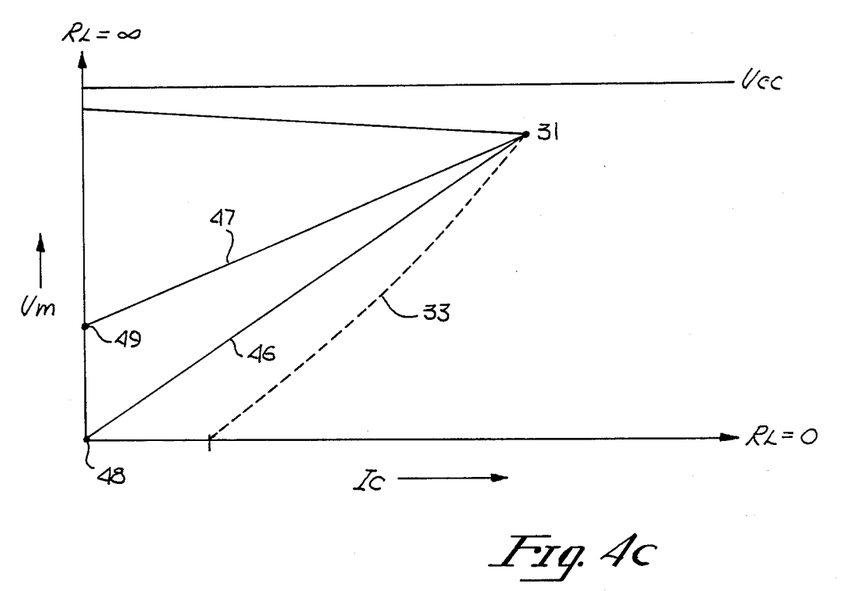
FIG. 4c is a graphic representation of the latching of two prior art circuits versus the non-latching circuit of the present invention.

FIG. 4c illustrates more examples of curves that will produce latch-up problems. Curve 47 having an intersection at point 49 will have latch-up problems similar to FIG. 4b, wherein the load line emanating from the origin may intersect curve 47 in more than one point. Curve 46, which is a typical prior art curve having an intersection at the origin 48, theoretically has infinite latch-up points because the curve 46 between points 48 and 31 correspond to the load line itself. Therefore, the latch-up may occur anywhere between points 48 and 31. Again, by having the circuit follow curve 33, the circuit is made latch-up proof.

Figure 5:
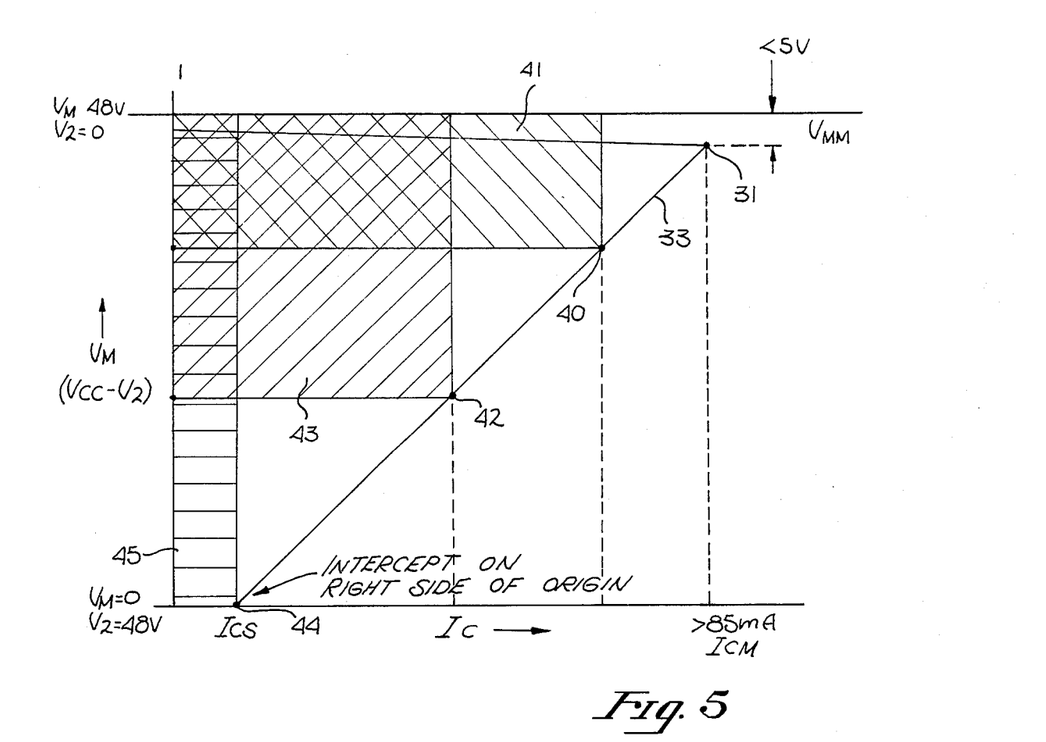
FIG. 5 illustrates the power dissipation of the M-lead driver circuit.

FIG. 5 illustrates the operational characteristic of a circuit following curve 33. The part of the curve between the ordinate axis and point 31 provides the performance required by the EIA specification. When $V_M$ drops below point 31, the circuit will follow curve 33. Therefore, at point 40, switch 21 will dissipate power shown by the enclosed area 41. Maximum power dissipation as shown by enclosed area 43 occurs when the circuit is operating at point 42. When M-lead 24 is shorted, the circuit will be operating at point 44 and switch 21 will dissipate power as represented by the enclosed area 45. Note that a prior art circuit will dissipate power equivalent to an area enclosed by the vertical line at 85 mA.

Figure 6:
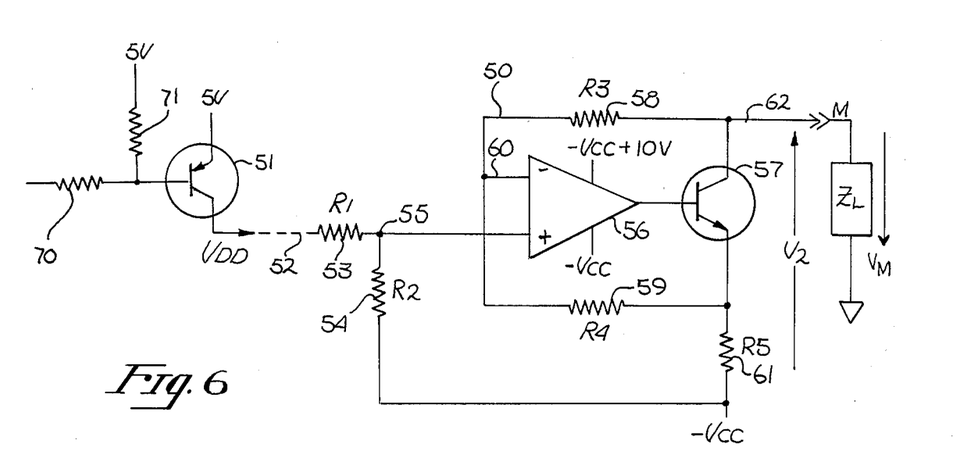
FIG. 6 is a circuit schematic diagram of a M-lead driver.

FIG. 6 is a schematic diagram of the circuit for the purpose of calculating circuit parameters to achieve a characteristic as represented by curve 33. The following equations provide the solution to achieving a desirable curve 33 (refer to circuit designations in FIG. 6):

$$I_C = \frac{1}{R_5}\left[\frac{R_2(R_3 + R_4)}{R_3(R_1 + R_2)}(V_{CC} + V_{DD}) - V_2\frac{R_4}{R_3}\right] \quad \text{Equation 2}$$

$$I_{CS} = \frac{1}{R_5}\left[\frac{R_2(R_3 + R_4)}{R_3(R_1 + R_2)}(V_{CC} + V_{DD}) - V_{CC}\frac{R_4}{R_3}\right] \quad \text{Equation 3}$$

$$I_{CM} = \frac{1}{R_5}\left[\frac{R_2}{R_1 + R_2}(V_{CC} + V_{DD}) - V_{CE(SAT)}\frac{R_4}{R_3 + R_4}\right] \quad \text{Equation 4}$$

$$V_{MM} = I_{CM}R_5 + V_{CE(SAT)} \quad \text{Equation 5}$$

$$P_{MAX} = \frac{1}{4}\left[I_{CM}V_{CC} + I_{CS}V_{MM} + V_{MM}V_{CC}\frac{I_{CM} - I_{CS}}{V_{CC} - V_{MM}} + \right. \quad \text{Equation 6}$$

-continued $$\left. \frac{I_{CM}I_{CS}}{I_{CM} - I_{CS}}(V_{CC} - V_{MM})\right]$$

$$Z_L \text{ at max power} = \frac{(V_{CC}I_{CM} + V_{MM}I_{CS} - 2V_{CC}I_{CS})(V_{CC} - V_{MM})}{(V_{CC}I_{CM} - V_{MM}I_{CS})(I_{CM} - I_{CS})} \quad \text{Equation 7}$$

With EIA standards in regards to switch 21, $V_{MM}=5$ V maximum, $V_{CC}=48$ V nominal, $I_{CM}=85$ mA minimum.

A similar circuit may be implemented to achieve similar results for switch 22. With switch 22, EIA requirements are: $I_{CM}=50$ mA minimum, $V_{MM}=1$ V maximum, $-V_{CC}=48$ V nominal. Note that for simplicity of explanation, the driver circuit is represented as a simple switch in FIGS. 2 and 3, but in practice it is a circuit of FIG. 6 implemented twice.

From the equations, it is noteworthy that the circuit response is mainly dependent on the resistors alone. Because active device parameters, especially the beta value, and the $V_{BE}$ (base-emitter voltage), of a transistor, usually have wide tolerances, it is difficult to maintain a precise V-I characteristic curve for the driver circuit. When such loose tolerances are encountered, the driver circuit may cause an unwanted latch-up condition to occur. In order to provide adequate margin to compensate for looser tolerances, a foldback curve will need to consider various $I_{CS}$ values which may result from various tolerance errors. To overcome varying tolerances resulting in a varying V-I characteristic, the present invention relies primarily on the parameters of the resistors. The only active component parameter in the equations, $V_{CE}$, contributes an insignificant effect in the equation, because $V_{CE}$ is much less than $V_{CC}+V_{DD}$. The preferred embodiment uses resistors which tend to have tighter tolerances than active components. Therefore, by having the V-I characteristic of the circuit independent of active component parameters, the circuit operates within an area of certainty not achieved by prior art circuits.

Figure 8A:
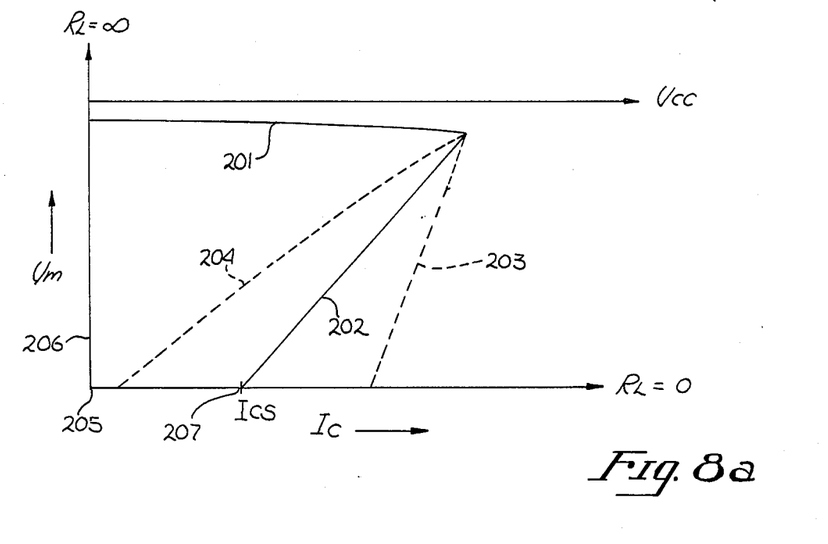
FIG. 8a is a graphic representation of a load line dependent on active device parameters.
Figure 8B:
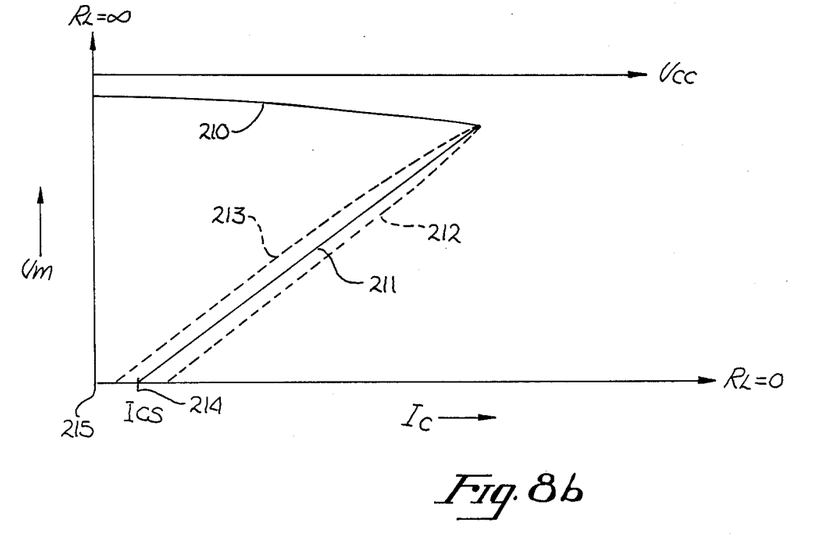
FIG. 8b is a graphic representation of a load line of the present invention dependent on resistor parameters.

Referring to FIGS. 8a and 8b, an example of the above-description in the previous paragraph is illustrated. FIG. 8a shows a V-I curve 201 having a foldback portion 202. Hypothetically, if a V-I curve is dependent on active device parameters, the wide tolerances which may shift the operating characteristic of foldback portion 202 is shown by dotted lines 203 and 204. The foldback portion 202 must be chosen such that line 204 will not intersect the origin 205 or ordinate axis 206, which will then result in a latch-up condition. Further, because $I_{CS}$ point 207 must be chosen appreciably far from the origin 205, the power dissipation will also be higher. This is especially so when the foldback portion 202 shifts toward line 203.

However, when V-I characteristic is dependent only on resistor values, as is the case of the present invention, FIG. 8b shows an improved result. Referring to FIG. 8b, a V-I curve 210, having a foldback portion 211, is shown. Dotted lines 212 and 213 show the extent of shifting the operating characteristic of foldback portion 211. Because resistor tolerances can be controlled much closely than active device parameters, foldback portion 211 varies slightly, allowing for $I_{CS}$ point 214 to be much closer to the origin 215. As a result, the design center of the foldback portion of the V-I characteristic curve can be chosen to cut the origin at a close proximity, thereby allowing maximum advantage to be taken on the foldback portion of the curve for the least possible power dissipation.

Another achievement of the design of the present invention, as manifested in the equations, is its ability to maintain a steady foldback response when encountering large variations in $V_{CC}$. By utilizing optimally chosen resistor combinations from the above equations, $V_{CC}$ variations will have little effect on foldback portion of a V-I characteristic curve.

Figure 9A:
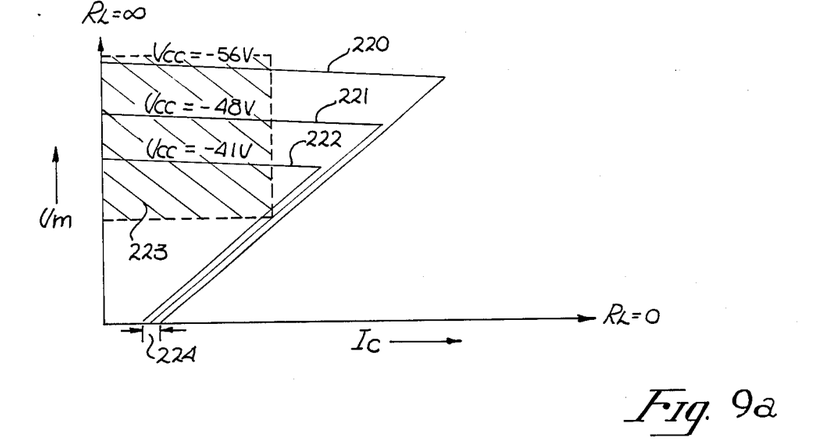
FIG. 9a is a graphic representation of a load line family of the present invention operating at various $V_{CC}$ values.
Figure 9B:
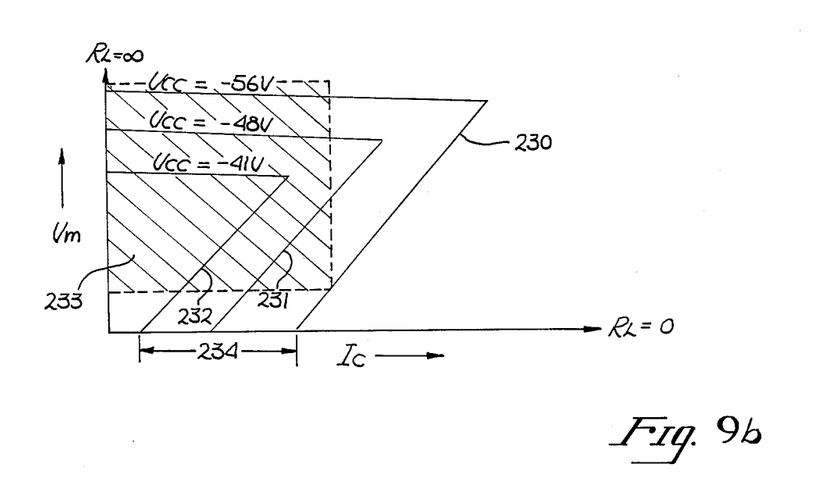
FIG. 9b is a graphic representation of a load line family operating at various $V_{CC}$ values and exhibiting an undesirable result.
Figure 9C:
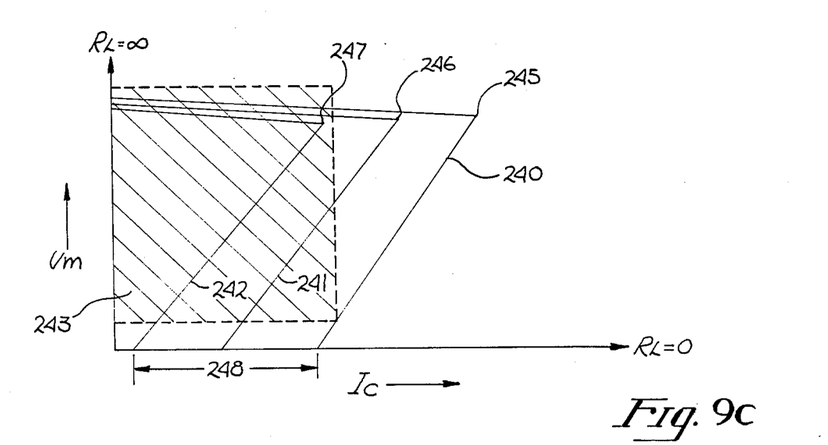
FIG. 9c is a graphic representation of a load line family operating at various $V_{CC}$ values and exhibiting another undesirable result.

Referring to FIGS. 9a, 9b, and 9c, FIG. 9a shows a V-I curve family of the present invention operating at three different $V_{CC}$ values. Curve 220, 221 and 222 operating at $V_{CC}$ values of $-56$ V, $-48$ V and $-41$ V, respectively. FIG. 9b shows an undesirable V-I characteristic curve family, wherein curves 230, 231 and 232 operate at the same $V_{CC}$ values as curves 220-222, respectively. The undesirable chacteristic is noticeable in FIG. 9b, because as $V_{CC}$ is varied, the foldback portions of curves 230-232 also vary substantially resulting in wide variations of $I_{CS}$ 234. However, the V-I characteristic curve of the present invention as shown in FIG. 9a, prevents significant variations of the foldback portion even when $V_{CC}$ is varied, thereby resulting in a narrower variation of $I_{CS}$ 224. That difference in the variation of $I_{CS}$ is again translated into lower permissible maximum power dissipation, as exemplified by area 223 and 233.

FIG. 9c shows another example of an undesirable V-I characteristic curve family which the present invention prevents. Curves 240, 241 and 242 operate in such a way that the foldback points 245, 246 and 247 vary widely resulting in a variation of $I_{CS}$ 248 and maximum power dissipation as shown by area 243.

When $V_{CC}$ is varied, the circuit of the prsent invention permits foldback points to occur such that the foldback portions of the curve are not widely dispersed (as shown in FIG. 9a).

Referring to FIG. 6, a switching signal is coupled to the base of transistor 51 through input resistor 70. A pull-up resistor 72 is also coupled to the base of transistor 51 providing a pull-up to $+5$ volts. Output at the collector of transistor 51 provides a selection between $+5$ volts nominal and an open state as input 52 to a driver circuit 50. The input 52 is coupled to the positive input terminal 55 of operational amplifier 56 through resistor 53. Supply voltage ($-V_{CC}$) is also coupled to the positive terminal 55 through resistor 54.

Operational amplifier 56 has its power connections coupled to $-V_{CC}$ and $-V_{CC}+10$ V. The output of operational amplifier 56 is coupled to the base of transistor 57. The collector of transistor 57 is coupled to M-lead 62, which is then coupled to load $Z_L$. The collector of transistor 57 is also coupled back to the negative input terminal 60 through feedback resistor 58. The emitter of transistor 57 is coupled to $-V_{CC}$ through resistor 61. The emitter of transistor 57 is also coupled to negative terminal 60 through feedback resistor 59.

In the quiescent condition when transistor 51 is on, resistors 53 and 54 establish a voltage divider network for the supply voltage $-V_{CC}$. Terminal 55 provides a constant reference voltage level. Further, terminal 55 will fluctuate correspondingly as the supply voltage varies, whereby a reference voltage level which follows closely with the supply voltage $-V_{CC}$ is maintained at the positive input of operational amplifier 56.

When transistor 51 is off, input 52 will be open, terminal 55 will be at $-V_{CC}$ and driver circuit 50 is turned off. When transistor 51 is on, input 52 is driven to 5 V and driver circuit 50 is turned on. Amplifier 56 senses the reference signal at terminal 55 and turns on transistor 57. Resistors 58 and 59 provide feedback paths to the negative terminal 60 of amplifier 56. Resistor 61 acts as a current sensing device.

During normal operation, transistor 57 is saturated and drives M-lead 62. When maximum current is drawn by the M-lead 62, resistor 61 senses the increase in current as a voltage drop across resistor 61. The increased voltage drop in the driver circuit 50 along with a smaller voltage drop across the load is felt at terminal 60, which forces amplifier 56 to slowly turn-off transistor 57 thereby increasing the impedance in the driver circuit 50. The turn-off rate is represented by curve 33 in FIGS. 3, 4 and 5 and described by the equations above. Curve 33 being the bend-back portion of the V-I characteristic curve in those figures. When M-lead 62 has a shorted load, transistor 57 conducts just enough to allow shorted current $I_{CS}$ to flow.

Figure 7:
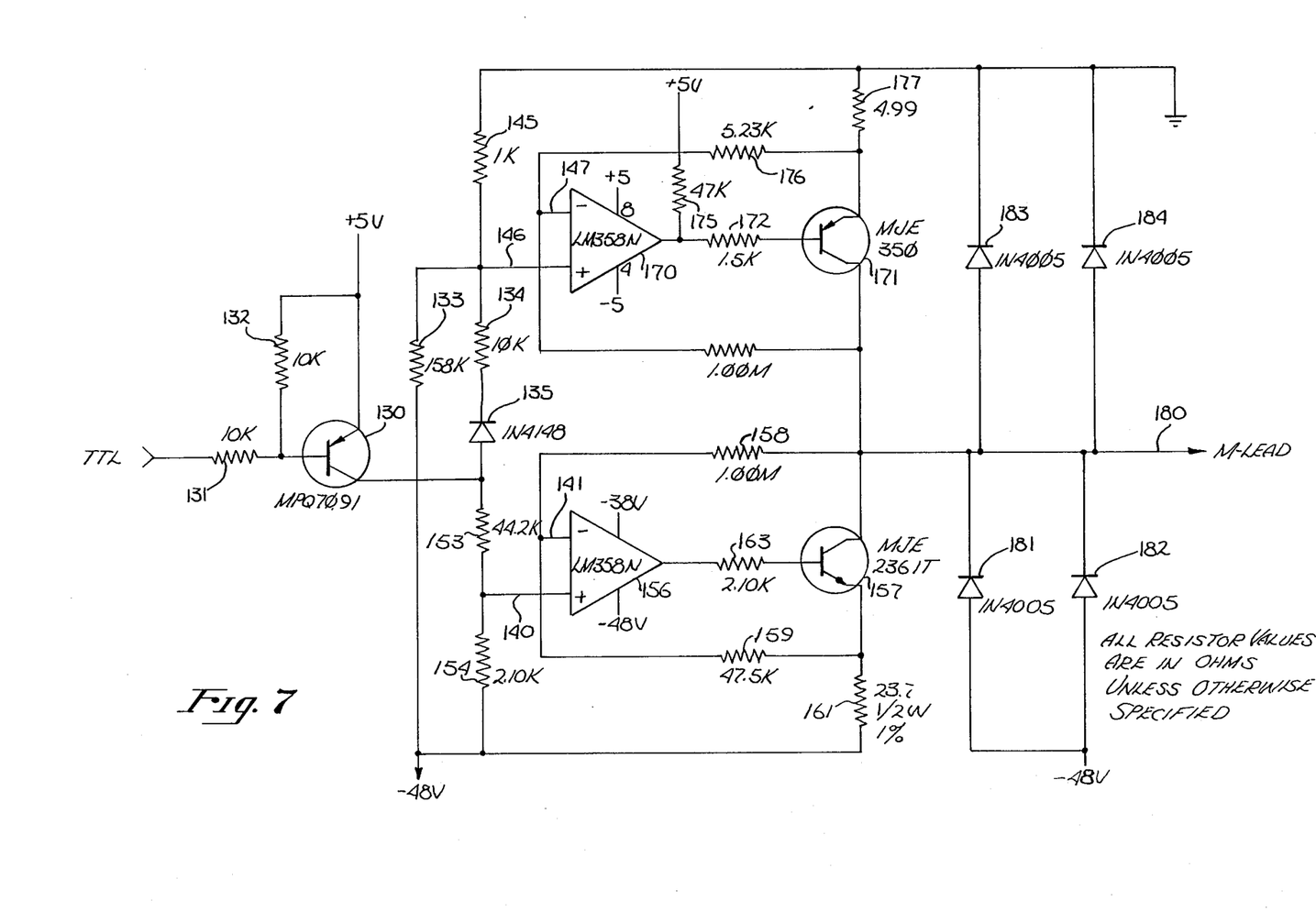
FIG. 7 is a complete circuit schematic diagram of a preferred embodiment of a M-lead driver.

FIG. 7 is a schematic diagram of a preferred embodiment of the complete M-lead driver circuit with circuit values determined by the earlier equations. At TTL switching signal is coupled to the base of transistor 130 (MPQ 7091) through a 10K ohm resistor 131. A supply voltage of $+5$ volts is coupled to the emitter of transistor 130 as well as to the base of transistor 130 through a 10K ohm resistor 132. The output at the collector of transistor 130 is coupled to the positive input terminal 140 of operational amplifier 156 (LM 358N) through a 44.2K ohm resistor 153. The input terminal 140 is coupled to the $-48$ volt supply through a 2.10K ohm resistor 154. The power leads of the operational amplifier 156 are coupled to $-38$ volts and $-48$ volts. The output of the operational amplifier 156 is coupled to the base of transistor 157 (MJE 2361T) through a 2.10K ohm resistor 163. The collector of transistor 157 is coupled to M-lead 180 and also to the negative input terminal 141 of operational amplifier 156 through 1.0M ohm resistor 158. The emitter of transistor 157 is coupled to the $-48$ volts through a 23.7 ohm (½ watt one percent) resistor 161. The emitter of transistor 157 is also coupled back to the negative input terminal 141 through a 47.5 Kohm resistor 159.

The collector of transistor 130 is also coupled to the anode of diode 135 (1N4148). The cathode of diode 135 is coupled to the positive input terminal of operational amplifier 170 through a 10K ohm resistor 134. Further, the positive input terminal 146 is coupled to $-48$ volts through a 158K ohm resistor 133 and to ground through a 1K ohm resistor 145. Operational amplifier 170 has its power leads connected to $+5$ volts and $-5$ volts. The output of operational amplifier 170 is coupled to the base of transistor 171 through a 1.5K ohm resistor 172. The output of amplifier 170 is also coupled to $+5$ volts through a 47K ohm pull-up resistor 175. The emitter of transistor 171 is coupled to ground through a 4.99 ohm resistor 177. The emitter of transistor 171 is also fed back through the input terminal 147 through a 5.23K ohm resistor 176. The collector of transistor 171 is coupled directly to the M-lead 180 and also to the negative input terminal 147 through a 1.0M ohm resistor 178. Clamping diodes 181 and 182 (1N4005) have their cathodes coupled to the M-lead 180 and their anodes coupled to $-48$ volts. Clamping diodes 183 and 184

(1N4005) have their anodes coupled to the M-lead and cathodes to ground.

The lower portion of the circuit comprising amplifier 56 and transistor 57 represents switch 21 of FIG. 2. The upper portion of the circuit comprising amplifier 170 and transistor 171 represents switch 22 of FIG. 2. The lower portion of the circuit comprising operational amplifier 156 is equivalent to the circuit of FIG. 6. The upper portion of the circuit is essentially equivalent except that it is symmetrically opposite the circuit in FIG. 6. Resistors 163 and 172 are used for current limiting purposes in each driver. Resistor 175 is used as a pull-up resistor with amplifier 170.

Note that in the preferred embodiment:
$R_1=44.2K$ ohms, $R_2=2.10K$ ohms, $R_3-1.00M$ ohms, $R_4=47.5K$ ohms, $R_5=23.7$ ohms,
and for $-V_{CC}=-48$ V, $V_{DD}=4.8$ V, and $V_{CE}=0.2V$
From equation 3, $I_{CS}=9.6$ mA
From equation 4, $I_{CM}=100.7$ mA
From equation 5, $V_{MM}=2.587$ V
From equation 6, $P_{MAX}=1.397$ W Also note that in the determination of $I_{CS}$ (equation 3), the coefficients of the $V_{CC}$ terms in the equation are $$\frac{R_2(R_3 + R_4)}{R_3(R_1 + R_2)} \text{ and } \frac{R_4}{R_3}.$$

In order to achieve the independence of the foldback curve on $V_{CC}$, the above resistor set was chosen such that $$\frac{R_2(R_3 + R_4)}{R_3(R_1 + R_2)} = 0.04751 \text{ and } \frac{R_4}{R_3} = 0.04750,$$

thereby the $V_{CC}$ terms almost cancel out, achieving the set of curves as shown in FIG. 9a.

Although the driver circuit is disclosed in conjunction with driving an M-lead on a tie trunk of a telephone branch exchange, those skilled in the art will realize that the circuit may be utilized in any telephone line driver, as well as any other power controlling application. Further, any passive load condition, even a pure capacitive load, will not cause latch-up in the circuit. Also, circuit values are given for one set of parameters and are not limited to the values disclosed.

Thus, an improved M-lead driver circuit having lower power dissipation and no latch-up has been described.

I claim:

1. In a telecommunication network where a load is coupled to be driven by a driver, a circuit to limit power dissipation in said driver when said load impedance drops below a predetermined threshold value, comprising:
    an active device coupled to drive said load;
    detection means coupled to said active device for sensing a drive current of said active device;
    control means coupled to said active device and said detection means for controlling conduction of said active device, said control means causes said active device to operate in its saturation region while impedance of said load is above said threshold value, but when impedance of said load falls below said threshold value, said detection means senses decrease of impedance of said load and in response thereto, said control means causes said active device to conduct less such that decrease of said drive current is proportional to said decrease of impedance of said load;
    said control means controlling said active device such that for each given value of impedance of said load, said active device functions to provide only one value of said drive current.

2. The circuit as defined in claim 1, wherein when said load is shorted said drive current is at a non-zero value.

3. The circuit as defined in claim 2, wherein said control means is comprised of an operational amplifier having a feedback path from said detection means.

4. The circuit as defined in claim 3, further including a second active device coupled to said load, second detection means coupled to said second active device, second control means coupled to said second active device and said second detection means; each functioning equivalently to said first set of active device, detection means and control means; and switching means coupled to both said control means, wherein said switching means selectively switches one of said active devices to drive said load.

5. The circuit as defined in claim 4, wherein said active devices are coupled to an M-lead on a tie trunk between branch exchanges of said telecommunication network.

6. The circuit as defined in claim 5, wherein said switching means is controlled by a TTL level signal.

7. An improved driver circuit for use on a telecommunication line to drive a load coupled to said driver circuit and to prevent an overload in said driver circuit when impedance of said load decreases below a predetermined value, comprising:
    a first transistor coupled to said load for providing a drive current through said load;
    a first resistor coupled to said first transistor and disposed in series with said first transistor and said load for developing a voltage drop which is a function of said drive current;
    first control means coupled to said first transistor and said first resistor for controlling said drive current by controlling conduction of said first transistor as function of said voltage drop across said first resistor;
    said first control means causing said first transistor to operate in its saturation region while impedance of said load is above said predetermined value, but when impedance of said load falls below said predetermined value, said first control means causes said first transistor to conduct less such that decrease of said drive current is proportionate to decrease of impedance of said load,
    said control means further causing said first transistor to conduct to provide a non-zero drive current when said load is shorted, wherein power dissipation of said driver circuit is maintained below a predetermined maximum power dissipation level when said load is shortened.

8. The driver circuit as defined in claim 7, wherein for each given impedance value of said load, said first transistor will function to provide only one corresponding value of said drive current.

9. The driver circuit as defined in claim 8, functions to provide control of said drive current independent of a supply voltage variation to said driver circuit.

10. The driver circuit as defined in claim 9, wherein said first transistor is coupled to an M-lead on a tie trunk between branch exchanges of a telecommunications network.

11. The driver circuit as defined in claim 10, wherein said supply voltage is approximately between −41 and −56 volts.

12. The driver circuit as defined in claim 11, further including a second transistor coupled to said load, second resistor coupled to said second transistor, second control means coupled to said second transistor and said second resistor each functioning equivalently to said first transistor, first resistor and first control means, respectively; and switching means coupled to both said control means for selectively switching one of said drivers to said load.

13. The driver circuit as defined in claim 12, wherein said predetermined value of said first transistor is reached when said first transistor drives approximately 85 mA and said predetermined value of said second transistor is reached when said second transistor drives approximately 50 mA.

14. The driver circuit as defined in claim 13, wherein said first transistor has less than 5 volts impressed across itself at its predetermined value and said second transistor has less than 1 volt impressed across itself at its predetermined value.

15. The driver circuit as defined in claim 14, wherein each of said control means is comprised of an operational amplifier having a feedback path from its respectively coupled resistor.

16. The driver circuit as defined in claim 15, wherein said switching means is controlled by a TTL level signal.

* * * * *